United States Patent
Oshima

(10) Patent No.: US 8,873,097 B2
(45) Date of Patent: Oct. 28, 2014

(54) INFORMATION TRANSMITTING APPARATUS AND METHOD, AND NON-TRANSITORY COMPUTER READABLE MEDIUM

(71) Applicant: Fuji Xerox Co., Ltd., Tokyo (JP)

(72) Inventor: Akihide Oshima, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 13/895,886

(22) Filed: May 16, 2013

(65) Prior Publication Data

US 2014/0132984 A1    May 15, 2014

(30) Foreign Application Priority Data

Nov. 15, 2012  (JP) ................................. 2012-250884

(51) Int. Cl.
*G06F 15/00* (2006.01)
*G06F 3/12* (2006.01)

(52) U.S. Cl.
CPC ............ *G06F 3/1207* (2013.01); *G06F 3/1259* (2013.01); *G06F 3/1285* (2013.01)
USPC ....................................................... 358/1.15

(58) Field of Classification Search
USPC ....................................................... 358/1.15
See application file for complete search history.

(56) References Cited

U.S. PATENT DOCUMENTS

2011/0080609 A1*  4/2011  Park ............................. 358/1.15

FOREIGN PATENT DOCUMENTS

JP        2001-282472 A    10/2001

* cited by examiner

*Primary Examiner* — Saeid Ebrahimi Dehkordy
(74) *Attorney, Agent, or Firm* — Sughrue Mion, PLLC

(57) ABSTRACT

An information transmitting apparatus includes a first interface connected to a first network; a second interface connected to a second network; a saving unit that saves, when the first or second interface receives information from a device belonging to the first or second network, identification information of the device in a memory; and a transmitter that transmits, at a certain timing, information to the device indicated by the saved identification information. The saving unit saves, when the first or second interface receives information transmitted from a device belonging to the first or second network, interface information indicating the network interface that has received the information and identification information of the device in an associative manner in the memory. The transmitter obtains the interface information associated with the saved identification information and transmits information via the network interface indicated by the obtained interface information.

18 Claims, 3 Drawing Sheets

| IF INFORMATION | HOST NAME |
|---|---|
| FIRST NETWORK IF | OUTSIDE PERSON PC1 |
| FIRST NETWORK IF | OUTSIDE PERSON PC2 |
| SECOND NETWORK IF | YAMADA PC |
| ... | ... |

INFORMATION TRANSMITTING APPARATUS AND METHOD, AND NON-TRANSITORY COMPUTER READABLE MEDIUM

CROSS-REFERENCE TO RELATED APPLICATIONS

This application is based on and claims priority under 35 USC 119 from Japanese Patent Application No. 2012-250884 filed Nov. 15, 2012.

BACKGROUND

1. Technical Field

The present invention relates to an information transmitting apparatus and method and to a non-transitory computer readable medium.

2. Summary

According to an aspect of the invention, there is provided an information transmitting apparatus including a first interface, a second interface, a saving unit, and a transmitter. The first interface is a network interface connected to a first network. The second interface is a network interface connected to a second network. The saving unit saves, when the first interface or the second interface receives information transmitted from a device belonging to the first network or the second network, identification information of the device in a memory. The transmitter that transmits, at a certain timing, information to the device indicated by the identification information saved in the memory. The saving unit saves, when the first interface or the second interface receives information transmitted from a device belonging to the first network or the second network, interface information indicating the network interface that has received the information and identification information of the device in an associative manner in the memory. The transmitter obtains the interface information associated with the identification information saved in the memory and transmits information via the network interface indicated by the obtained interface information.

BRIEF DESCRIPTION OF THE DRAWINGS

An exemplary embodiment of the present invention will be described in detail based on the following figures, wherein.

DETAILED DESCRIPTION

Hereinafter, an exemplary embodiment of the invention will be described in detail with reference to the drawings.

Figure 1:
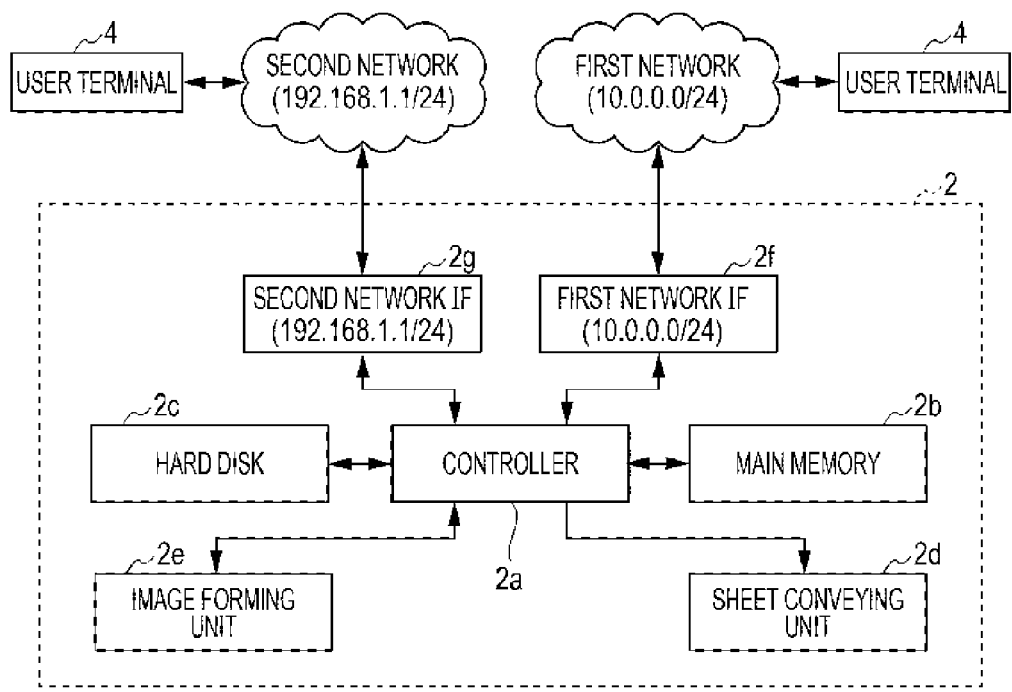
FIG. 1 is a block diagram illustrating an example of the configuration of an image forming apparatus.

FIG. 1 is a diagram illustrating an example of the configuration of an image forming apparatus (information transmitting apparatus) 2 according to an exemplary embodiment of the invention. In the case of the exemplary embodiment, the image forming apparatus 2 is realized as a computer with a print function, a scan function, a fax communicating function, and the like (so-called a multi-functional apparatus), and is located in an office of a certain company X. As illustrated in FIG. 1, the image forming apparatus 2 includes a controller 2a realized by a microprocessor. The controller 2a executes various information processes and controls other elements in accordance with a program stored in a main memory 2b described later. Also, the image forming apparatus 2 includes the main memory 2b, which is realized by a read-only memory (ROM) and a random-access memory (RAM). The main memory 2b stores data necessary in the course of information processing performed by the controller 2a. The main memory 2b also stores the above-described program. This program may be read from a computer-readable information storage medium, such as a digital versatile disc (DVD; registered trademark)-ROM or the like, and stored in the main memory 2b, or may alternatively be downloaded via a network and stored in the main memory 2b.

The image forming apparatus 2 also includes a hard disk 2c. The hard disk 2c stores various types of data. The image forming apparatus 2 also includes a sheet conveying unit 2d and an image forming unit 2e. In accordance with a command from the controller 2a, the sheet conveying unit 2d conveys print sheet held in a sheet holding unit (not illustrated) to the image forming unit 2e. The image forming unit 2e is, for example, a laser printer, and, in accordance with a command from the controller 2a, prints an image on the print sheet conveyed by the sheet conveying unit 2d.

The image forming apparatus 2 also includes multiple network interfaces, that is, a first network interface (hereinafter represented as a "first network IF") 2f and a second network interface (hereinafter represented as a "second network IF") 2g. The first network IF 2f is a network interface for connecting the image forming apparatus 2 to a first network represented by the IP address "10.0.0.0/24". The IP address "10.0.0.0/24" is assigned to the first network IF 2f. Also, the second network IF 2g is a network interface for connecting the image forming apparatus 2 to a second network represented by the IP address "192.168.1.1/24". The IP address "192.168.1.1/24" is assigned to the second network IF 2g.

Here, the first network and the second network will be described. In the exemplary embodiment, both the first network and the second network are networks provided at the company X described above. However, the first network and the second network are different in the following point.

That is, the second network is an open network and is connected to the Internet via a firewall (not illustrated). Also, the second network is a network for the employees of the company X, and a user terminal 4 of each employee is always connected by wire or wirelessly to the second network. That is, the user terminal 4 of each employee belongs to the second network. Each employee obtains information from the Internet by using his/her user terminal 4, or causes the image forming apparatus 2 to perform printing.

In contrast, the first network is not an open network, but is a closed network. Also, the first network is a network for an outside person who visits the company X and is used for enabling the outside person to temporarily use the image forming apparatus 2. A user terminal (such as a notebook personal computer) 4 of an outside person who visits the company X is temporarily connected to the first network, and the user terminal 4 of the outside person belongs to the first network. An outside person who visits the company X connects his/her user terminal 4 to the first network, and is enabled to use the image forming apparatus 2.

In the case of the exemplary embodiment, the image forming apparatus 2 corresponds to Web Services on Devices (WSD) protocols. When a driver program of the image forming apparatus 2 is installed in a user terminal 4, this user terminal 4 is registered in the image forming apparatus 2. Also, the image forming apparatus 2 transmits print completion notification data reporting the completion of printing every time printing is completed.

Here, the print competition notification data includes confidential information, personal information, and the like, which are represented by the name of a printed document. Thus, when printing in response to an instruction from a user terminal 4 belonging to the first network is completed, the image forming apparatus 2 transmits print completion notification data to the first network, and, when printing in response to an instruction from a user terminal 4 belonging to the second network is completed, the image forming apparatus 2 transmits print completion notification data to the second network. Therefore, for example, information held by an outside person who visits the company X is prevented from being leaked to the employees of the company X who do not relate at all to the outside person. This point will be described hereinafter.

Figure 2:
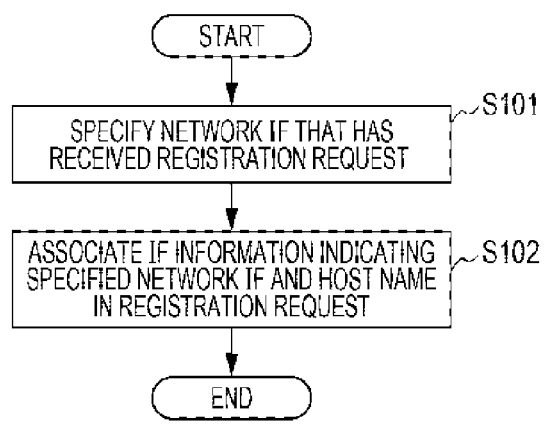
FIG. 2 is a flowchart illustrating an example of a process executed by the image forming apparatus.
Figures 3, 4:
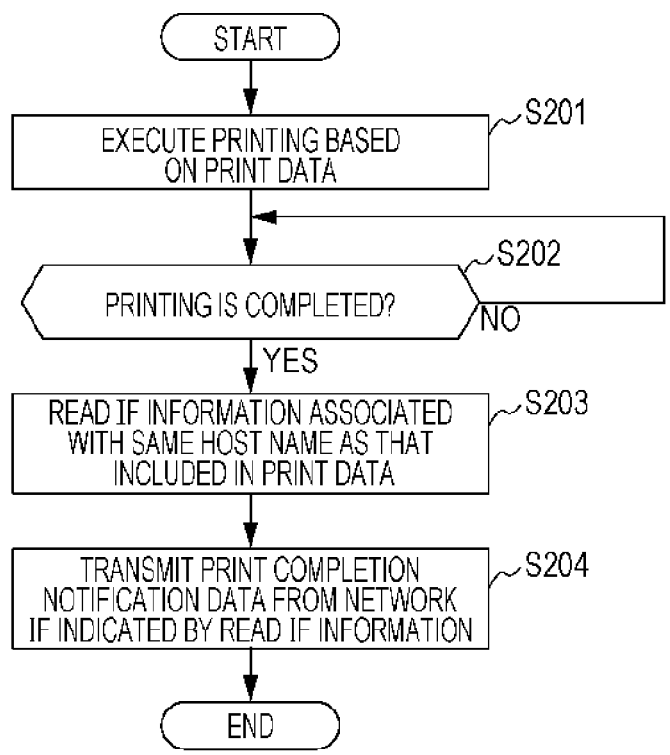
FIG. 3 is a diagram illustrating an example of a database.
FIG. 4 is a flowchart illustrating an example of a process executed by the image forming apparatus.

FIG. 2 is a flowchart illustrating an example of a process executed by the image forming apparatus 2. When the driver program of the image forming apparatus 2 is installed in a user terminal 4, this user terminal 4 transmits registration requesting data that requests registration of the user terminal 4. The process illustrated in FIG. 2 is executed when the registration requesting data is received. That is, firstly, the controller 2*a* specifies a network interface that has received the registration requesting data (S101). On the basis of the registration requesting data, the controller 2*a* registers the user terminal 4 which has transmitted the registration requesting data. That is, the controller 2*a* (saving unit) saves, in a database stored in the hard disk 2*c*, the host name (identification information) of the user terminal 4 which has transmitted the registration requesting data, and interface information (hereinafter represented as "IF information") indicating the network interface specified in S101, in an associative manner (S102). FIG. 3 illustrates an example of the database. Note that the host name is, for example, the IP address of the user terminal 4. Also, the IF information is, for example, the IP address assigned to the network interface or the media access control (MAC) address of the network interface.

In this manner, in the image forming apparatus 2, the host name of the user terminal 4 which has transmitted the registration requesting data is not saved alone, but is saved in association with the network interface which has received the registration requesting data.

Next, the instances in which the database is used will be described. FIG. 4 is a flowchart illustrating an example of another process executed by the image forming apparatus 2. This process is executed when print data for which a print instruction is given is received from a user terminal 4. Note that the print data is also referred to as a print job.

Firstly, the controller 2*a* executes printing on the basis of the print data (S201). That is, the controller 2*a* causes the image forming unit 2*e* to print an image of a document to be printed, which is included in the print data. Note that the print data also includes, besides the image of the document to be printed, the name of the document to be printed, the host name (that is, IP address) of the user terminal 4 which has transmitted the print data, and the like.

The controller 2*a* performs communication with the image forming unit 2*e* and monitors whether printing is completed, on the basis of information from the image forming unit 2*e* (S202). When printing is completed (Y in S202), the controller 2*a* (transmitter) refers to the database and reads IF information associated with the same host name as that included in the print data (S203). The controller 2*a* (transmitter) transmits the print completion notification data (information) from a network interface indicated by the read IF information to the user terminal 4 which has transmitted the print data (S204). In the case of the exemplary embodiment, in step S204, the controller 2*a* broadcasts the print completion notification data to a user terminal 4 belonging to a network to which the network interface indicated by the IF information is connected.

In this manner, since the image forming apparatus 2 executes the processes, examples of which are illustrated in FIGS. 2 and 4, the print completion notification data is transmitted to the first network in response to completion of printing based on print data from a user terminal 4 belonging to the first network, whereas the print completion notification data is transmitted to the second network in response to completion of printing based on print data from a user terminal 4 belonging to the second network. Therefore, for example, information held by an outside person who visits the company X is prevented from being leaked to the employees of the company X who do not relate at all to the outside person.

Figure 5:
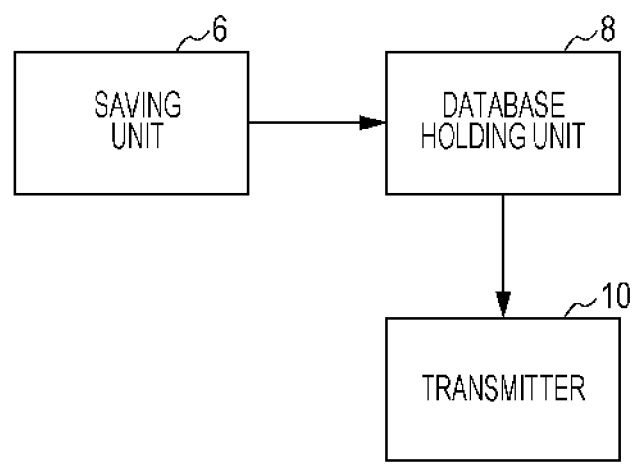
FIG. 5 is a functional block diagram illustrating an example of a group of functions realized in the image forming apparatus.

FIG. 5 is a functional block diagram illustrating an example of a group of functions realized in the image forming apparatus 2. As illustrated in FIG. 5, a saving unit 6, a database holding unit 8, and a transmitter 10 are realized in the image forming apparatus 2. The saving unit 6, the database holding unit 8, and the transmitter 10 are realized by executing, by the controller 2*a*, the above-described program stored in the main memory 2*b*. The saving unit 6 and the transmitter 10 are realized mostly by the controller 2*a*. Also, the database holding unit 8 is realized mostly by the hard disk 2*c* or the main memory 2*b*, and the database holding unit 8 holds the database.

When the first network IF 2*f* or the second network IF 2*g* receives information transmitted from a user terminal 4 belonging to the first network or the second network, the saving unit 6 saves the host name of this user terminal 4 which has transmitted the information and IF information indicating the network interface which has received the information in an associative manner in the database stored in the database holding unit 8.

In the case of the exemplary embodiment, the registration requesting data corresponds to "information". That is, when the first network IF 2*f* or the second network IF 2*g* receives the registration requesting data, the saving unit 6 saves the host name included in the registration requesting data and IF information indicating the network interface which has received the registration requesting data in an associative manner in the database (see FIG. 2).

The transmitter 10 transmits information to the user terminal 4 indicated by the host name held in the database. Note that the transmitter 10 selects a network interface used for transmitting information. That is, the transmitter 10 reads IF information associated with the host name held in the database. Then, the transmitter 10 transmits information from a network interface indicated by the read IF information.

In the case of the exemplary embodiment, the print completion notification data corresponds to "information". Also, in the case of the exemplary embodiment, transmission of the print completion notification data, which is "information", is performed in response to completion of printing based on print data after that print data has been received. Also, IF information associated with the same host name as that included in the print data, among host names held in the database, is read (see FIG. 4).

The exemplary embodiment of the invention is not limited to the above-described exemplary embodiment.

For example, when the first network IF 2f or the second network IF 2g receives status requesting data that requests notification of the status of the image forming apparatus 2, the saving unit 6 may save the host name of a user terminal 4 at the transmission source of the status requesting data, which is included in the status requesting data, and IF information indicating the network interface which has received the status requesting data in an associative manner in the database. In this case, the status requesting data corresponds to "information".

Furthermore, the transmitter 10 may read IF information associated with the same host name as that included in the status requesting data, among host names held in the database, and may transmit status data indicating the status of the image forming apparatus 2 from a network interface indicated by the read IF information. In this case, the status data corresponds to "information".

When status data includes the host name of a user terminal 4 at a transmission destination of this status data, status data may be periodically transmitted, instead of being transmitted in response to reception of status requesting data. That is, in this case, the transmitter 10 simply reads IF information associated with the same host name as that included in the status data, among host names held in the database, and transmits the status data from a network interface indicated by the read IF information.

The exemplary embodiment of the invention is also applicable to the case in which the image forming apparatus 2 has three or more network interfaces.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information transmitting apparatus comprising:
   a first network interface configured to be connected to a first network;
   a second network interface configured to be connected to a second network;
   a saving unit configured to save, in response to the first network interface or the second network interface receiving information transmitted from a device connected to the first network or the second network, identification information of the device in association with interface information indicating which of the first and second network interfaces received the information transmitted from the device; and
   a transmitter configured to obtain the saved interface information associated with the identification information of the device, and to transmit information to the device by using the first network interface or the second network interface as indicated by the interface information.

2. The information transmitting apparatus according to claim 1, further comprising an image forming unit that prints data included in the information transmitted from the device.

3. The information transmitting apparatus according to claim 2, wherein, after the image forming unit completes printing of the data included in the information transmitted from the device, the transmitter transmits the information to the device indicated by the identification information.

4. The information transmitting apparatus according to claim 1, wherein the transmitter periodically transmits the information to the device indicated by the identification information to update the device regarding a status of the information transmitting apparatus.

5. The information transmitting apparatus according to claim 1, in response to the device being connected to the second network, the information transmitted to the device is not leaked to the first network.

6. The information transmitting apparatus according to claim 1, wherein the information transmitted from the device includes a host name of the device.

7. The information transmitting apparatus according to claim 1, wherein the identification information includes an Internet Protocol (IP) address of the device.

8. The information transmitting apparatus according to claim 7, wherein the interface information that is stored in association with the identification information includes one from among an IP address of the first network and an IP address of the second network depending on whether the device is connected to the first network or the second network.

9. The information transmitting apparatus according to claim 7, wherein the interface information that is stored in association with the identification information includes one from among a media access control (MAC) address of the first network interface and a MAC address of the second network interface depending on whether the device is connected to the first network or the second network.

10. The information transmitting apparatus according to claim 1, wherein the saving unit saves a database that associates the identification information with the interface information.

11. The information transmitting apparatus according to claim 1, further comprising a receiving unit that receives requesting data the requests registration from the device.

12. The information transmitting apparatus according to claim 1, wherein the information transmitting apparatus corresponds to Web Services on Devices (WSD) protocols.

13. A non-transitory computer readable medium storing a program of machine-readable instructions executable by a computer to perform an instruction control method, the instruction control method including:
   saving, in response to a first network interface connected to a first network or a second network interface connected to a second network receiving information transmitted from a device connected to the first network or the second network, identification information of the device in association with interface information indicating which of the first and second network interfaces received the information transmitted from the device;
   obtaining the saved interface information associated with the identification information; and
   transmitting information to the device by using the first network interface or the second network interface as indicated by the interface information.

14. The non-transitory computer readable medium according to claim 13, wherein the instruction control method further includes receiving requesting data that requests registration from the device.

15. The non-transitory computer readable medium according to claim 13, wherein the instruction control method corresponds to Web Services on Devices (WSD) protocols.

16. An information transmitting method comprising:
   saving, in response to a first network interface connected to a first network or a second network interface connected to a second network receiving information transmitted from a device connected to the first network or the second network, identification information of the device in association with interface information indicating which of the first and second network interfaces received the information transmitted from the device;

obtaining the saved interface information associated with the identification information; and transmitting information to the device by using the first network interface or the second network interface as indicated by the interface information.

17. The information transmitting method according to claim 16, wherein the instruction control method further includes receiving requesting data that requests registration from the device.

18. The information transmitting method according to claim 3, wherein the instruction control method corresponds to Web Services on Devices (WSD) protocols.

* * * * *